(12) United States Patent
Shin et al.

(10) Patent No.: US 8,952,647 B2
(45) Date of Patent: Feb. 10, 2015

(54) SWITCHING CONTROL APPARATUS AND METHOD OF TWO-PHASE SWITCHED RELUCTANCE MOTOR

(75) Inventors: Hong Chul Shin, Gyunggi-do (KR); Han Kyung Bae, Gyunggi-do (KR); Hyung Joon Kim, Gyunggi-do (KR); Guen Hong Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 149 days.

(21) Appl. No.: 13/591,142

(22) Filed: Aug. 21, 2012

(65) Prior Publication Data

US 2013/0293170 A1 Nov. 7, 2013

(30) Foreign Application Priority Data

May 7, 2012 (KR) ......................... 10-2012-0048188

(51) Int. Cl.
*H02P 25/08* (2006.01)
(52) U.S. Cl.
USPC ....................................... 318/701; 318/254.1
(58) Field of Classification Search
CPC ....... H02P 25/08; H02P 25/021; H02P 27/06; H02P 8/00; H02P 2201/13; H02P 3/14; H02P 5/685; H02P 6/14
USPC ............................................... 318/254.1, 701
See application file for complete search history.

(56) References Cited

U.S. PATENT DOCUMENTS

| 4,684,867 A | * | 8/1987 | Miller et al. | 318/701 |
| 6,014,001 A | * | 1/2000 | Guinet | 318/701 |
| 6,054,819 A | * | 4/2000 | Pengov | 318/254.2 |

FOREIGN PATENT DOCUMENTS

KR 1020100115209 10/2010

* cited by examiner

*Primary Examiner* — Bentsu Ro
(74) *Attorney, Agent, or Firm* — Ladas & Parry, LLP (57) ABSTRACT

Disclosed herein are a switching control apparatus and method of a two-phase switched reluctance motor. The witching control apparatus includes: a rectifying unit rectifying commercial power; and an active converter including a pair of common switches commonly connected to two phase windings of the two-phase SRM, a pair of first phase switches bridge-connected to the pair of common switches at any one of the two phase windings, a pair of second phase switches bridged-connected to the pair of common switches at the other of the two phase windings and connected in series with each other, and a plurality of current feedback diodes each connected to the switches and operated in operation modes 1 to 3 to drive the two-phase SMR.

12 Claims, 7 Drawing Sheets

SWITCHING CONTROL APPARATUS AND METHOD OF TWO-PHASE SWITCHED RELUCTANCE MOTOR

CROSS REFERENCE TO RELATED APPLICATION

This application claims the benefit of Korean Patent Application No. 10-2012-0048188, filed on May 7, 2012, entitled "Switching Control Apparatus for Two Phase Switched Reluctance Motor and Method Thereof", which is hereby incorporated by reference in its entirety into this application.

BACKGROUND OF THE INVENTION

1. Technical Field

The present invention relates to a switching control apparatus and method of a two-phase switched reluctance motor.

2. Description of the Related Art

In a switched reluctance motor (hereinafter, referred to as a SRM), which is a motor having a form in which it has a switching control apparatus coupled thereto, both of a stator and a rotor are formed in a salient type structure.

Particularly, since only a stator part has a winding wound therearound and a rotor part does not include any type winding or permanent magnet, the SRM has a simple structure.

Due to this structural feature, the SRM has a significant advantage in view of manufacturing and production, and has good start-up characteristics and a large torque, similar to a direct current motor. In addition, the SRM requires less maintenance and has excellent characteristics in view of a torque per unit volume, efficiency, rating of a converter, and the like, such that the usage of the SRM has gradually increased in various fields.

The SRM as described above may have various types such as a single-phase, a two-phase, a three-phase, and the like. Among others, the two-phase SRM has a driving circuit simpler than that of the three-phase SRM, such that it has been significantly prominent in applications such as a fan, a blower, a compressor, and the like.

Further, in a switching control apparatus of the two-phase SRM, various schemes have been suggested and used in order to control current of a stator winding in a single direction. As one of the suggested schemes, there is a switching control apparatus using an asymmetric bridge converter for driving an existing alternate current motor.

The asymmetric bridge converter has two switches and diodes per each phase and has three operation modes.

Here, an operation mode 1 is a mode in which both of the two switches are turned on to apply DC power voltage to a winding, thereby increasing current, an operation mode 2 is a mode in which the two switches are simultaneously turned off to rapidly decrease the current, and an operation mode 3 is a mode in which when the current flows in the winding, one switch is turned off to circulate the current through one diode and switch and the winding, thereby slowly decreasing the current.

The asymmetric bridge converter operated as described above is excellent in view of diversity of a control among converters for driving an SRM and may independently control currents of each phase, such that the currents of two phases may be overlapped with each other. In addition, the asymmetric bridge converter is appropriate for high voltage and large capacity and has a relatively low switch rated voltage.

However, the switching control apparatus of the two-phase SRM as described above requires two lead wires per each phase, such that a wiring becomes complicated to increase a difficulty in designing the circuit.

In addition, since the switching control apparatus of the two-phase SRM includes a plurality of independent diodes separated from a switch device, a manufacturing cost increases and a large manufacturing space is required.

[Patent Document]
Korean Patent Laid-Open Publication No. 2010-0115209

SUMMARY OF THE INVENTION

The present invention has been made in an effort to provide a switching control apparatus and method capable of reducing the number of lead wires of a two-phase switched reluctance motor while maintaining diversity of a control and independence of current controls of each phase.

Further, the present invention has been made in an effort to provide a switching control apparatus and method capable of reducing a cost and obtaining a spatial advantage by reducing the number of independent diodes separated from a switch device.

According to a preferred embodiment of the present invention, there is provided a switching control apparatus of a two-phase switched reluctance motor, including: a rectifying unit rectifying commercial power; and an active converter including a pair of common switches having two phase windings of the two-phase SRM commonly connected to a contact therebetween, a first phase switch and a first current feedback diode bridge-connected to the pair of common switches at any one of the two phase windings and connected in series with each other, a second phase switch and a second current feedback diode bridged-connected to the pair of common switches at the other of the two phase windings and connected in series with each other, and a plurality of current feedback diodes each connected to the switches and operated in operation modes 1 to 3 to drive the two-phase SMR.

The switching control apparatus may further include a microprocessor sensing a position and a speed of the two-phase SRM to control the active converter.

The pair of common switches may include an upper common switch and a lower common switch connected in series with each other and have the two phase winding of the two-phase SRM connected to the contact therebetween, the first phase switch and the first current feedback diode may be connected in series with each other, have any one of the two phase windings of the two-phase SRM connected to a contact therebetween, and be bridge-connected to the pair of common switches, and the second phase switch and the second current feedback diode may be connected in series with each other, have the other of the two phase windings of the two-phase SRM connected to a contact therebetween, and be bridge-connected to the pair of common switches.

The upper common switch and the first phase switch may be switched on to be operated in the operation mode 1 with respect to any one of the two phase windings of the two-phase SRM, and the lower common switch and the second phase switch may be switched on to be operated in the operation mode 1 with respect to the other of the two phase windings of the two-phase SRM.

The current feedback diode connected to the lower common switch and the first current feedback diode may be operated in the operation mode 2 with respect to any one of the two phase windings of the two-phase SRM, and the current feedback diode connected to the upper common switch and the second phase switch may be switched on to be operated in the operation mode 2 with respect to any one of the two phase windings of the two-phase SRM.

The current feedback diode connected to the first phase switch may provide a circulation path of residual current in a state in which the upper common switch is switched on to be operated in the operation mode 3 with respect to any one of the two phase windings of the two-phase SRM, and the current feedback diode connected to the upper common switch may provide a circulation path of the residual current in a state in which the second phase switch is switched on to be operated in the operation mode 3 with respect to any one of the two phase windings of the two-phase SRM.

The microprocessor may control the active converter so as to be changed from the operation mode 1 to the operation mode 3.

The microprocessor may control the active converter so as to be changed from the operation mode 1 to the operation mode 2 and from the operation mode 2 to the operation mode 3.

The microprocessor may control the active converter so as to repeat a process of changing an operation mode of the active converter from the operation mode 1 to the operation mode 2.

According to another preferred embodiment of the present invention, there is provided a switching control method of a two-phase switched reluctance motor, including: (A) controlling, in a microprocessor, an active converter including a pair of common switches having two phase windings of the two-phase SRM commonly connected to a contact therebetween, two groups of phase switches and current feedback diodes each bridge-connected to the pair of common switches at corresponding phase windings and connected in series with each other, and a plurality of current feedback diodes to excite any one of the phase windings and then remove residual current; and (B) controlling, in the microprocessor, the active converter to excite the other of the phase windings and then remove residual current.

The pair of common switches may include an upper common switch and a lower common switch connected in series with each other and have the two phase winding of the two-phase SRM connected to the contact therebetween, the two groups of phase switches and current feedback diodes may include a first phase switch and a first current feedback diode and a second phase switch and a second current feedback diode, the first phase switch and the first current feedback diode may be connected in series with each other, have any one of the two phase windings of the two-phase SRM connected to a contact therebetween, and be bridge-connected to the pair of common switches, and the second phase switch and the second current feedback diode may be connected in series with each other and have the other of the two phase windings of the two-phase SRM connected to a contact therebetween, and be bridge-connected to the pair of common switches.

In the control of the active converter in steps (A) and (B), the microprocessor may control the active converter so as to be changed from an operation mode 1 to an operation mode 3.

In the control of the active converter in steps (A) and (B), the microprocessor may control the active converter so as to be changed from an operation mode 1 to an operation mode 2 and from the operation mode 2 to an operation mode 3.

The microprocessor may control the active converter so as to repeat a process of changing an operation mode of the active converter from an operation mode 1 to an operation mode 2.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

Figure 1:
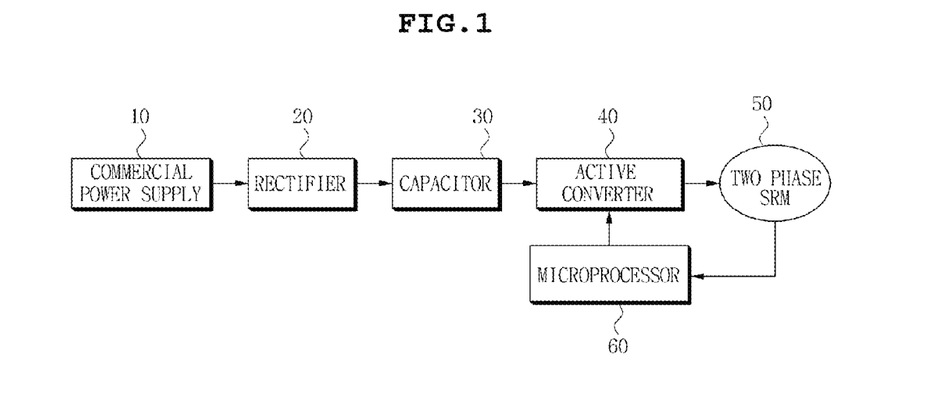
FIG. 1 is a configuration diagram of a switching control apparatus of a two-phase switched reluctance motor according to a first preferred embodiment of the present invention.

FIG. 1 is a configuration diagram of a switching control apparatus of a two-phase switched reluctance motor according to a first preferred embodiment of the present invention.

Referring to FIG. 1, the switching control apparatus of a two-phase switched reluctance motor according to the first preferred embodiment of the present invention is configured to include a rectifying unit 20 rectifying commercial power 10 to supply direct current (DC) power, a capacitor 30 connected to the rectifying unit 20, an active converter 40 connected to the capacitor 30, and a microprocessor 60 sensing a position and a speed of a two-phase SRM 50 to control the active converter 40.

The rectifying unit 20 rectifies the input commercial power 10 to supply the rectified power to the capacitor 30. In addition, the capacitor 30 improves a power factor of the rectified voltage and absorbs noise thereof to supply the power of which the power factor is improved and the noise is absorbed to the active converter 40.

The active converter 40 includes a pair of serially connected common switches having two phase windings of the two-phase SRM 50 commonly connected to a contact therebetween, a first current feedback diode and a first phase switch bridge-connected to the pair of common switches at any one of the two phase windings and connected in series with each other, a second phase switch and a second current feedback diode bridged-connected to the pair of common switches at the other of the two phase windings and connected in series with each other, and a plurality of current feedback diodes each connected to the switches and operated in operation modes 1 to 3 according to a control of the microprocessor 60 to drive the two-phase SRM 50.

Meanwhile, the microprocessor 60 senses the position and the speed of the two-phase SRM 50 and controls the pair of common switches and the first phase and second phase switches of the active converter 40 to allow the switches to be operated in the operation modes 1 to 3, thereby driving the two-phase SRM 50.

Here, in the operation mode 1, positive reference voltage is applied to a corresponding phase winding of the two-phase SRM 50 to increase current in the winding, in the operation mode 2, negative reference voltage is applied to a corresponding phase winding to rapidly decrease the current, and in the operation mode 3, the current is allowed to be circulated in the winding when it flows in the winding, such that it is slowly decreased.

The switch control apparatus of a two-phase switched reluctance motor configured as described above is operated as follows.

First, the microprocessor 60 controls the active converter 40 so as to be operated in the operation modes 1 to 3 to excite any one of the two phase windings of the two-phase SRM 50 and then finish a state in which the phase winding is excited.

Next, the microprocessor 60 controls the active converter 40 so as to be operated in the operation modes 1 to 3 to excite the other of the two phase windings of the two-phase SRM 50 and then finish a state in which the other winding is excited.

Then, the microprocessor 60 repeatedly performs these operations, thereby driving the two-phase SRM 50.

In this case, the microprocessor 60 may control the active converter 40 in various schemes so as to be operated in the operation modes 1 to 3.

As an example of various schemes in which the microprocessor 60 controls the active converter 40, there is a first switching scheme of changing the operation mode of the active converter 40 from the operation mode 1 to the operation mode 3, a second switching scheme of changing the operation mode from the operation mode 1 to the operation modes 2 and 3, or a third switching scheme of repeating the operation modes 1 and 3, that is, changing the operation mode from the operation mode 1 to the operation mode 3, from the operation mode 3 to the operation mode 1, and again from the operation mode 1 to the operation mode 3.

Figure 2:
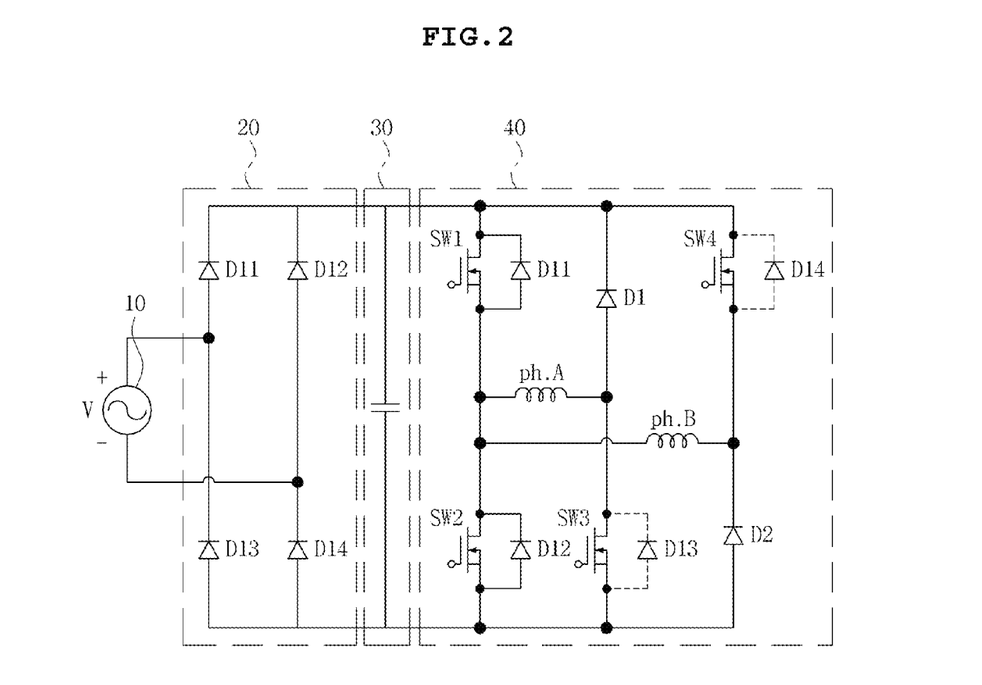
FIG. 2 is a detailed configuration diagram of a rectifying unit, a capacitor, and an active converter of FIG. 1.

FIG. 2 is a detailed configuration diagram of a rectifying unit, a capacitor, and an active converter of FIG. 1.

Referring to FIG. 2, the rectifying unit 20 of FIG. 1 is formed of a diode bridge rectifier including four diodes D11 to D14 and rectifies the input commercial power 10 to supply the rectified power to the capacitor 30.

In addition, the capacitor 30 improves the power factor of the rectified voltage and absorbs noise thereof to supply the power of which the power factor is improved and the noise is absorbed to the active converter 40.

The active converter 40 includes a pair of common switches SW1 and SW2 having A and B phase windings commonly connected to a contact therebetween, a first phase switch SW3 and a first current feedback diode D1 bridge-connected to the pair of common switches SW1 and SW2 at the A phase winding and connected in series with each other, a second phase switch SW4 and a second current feedback diode D2 bridge-connected to the pair of common switches SW1 and SW2 at the B phase winding and connected in series with each other, and four current feedback diodes D11 to D14 each connected the respective switches SW1 to SW4 and drives the two-phase SRM 50 according to the control of the microprocessor 60.

Here, each of the plurality of switches SW1 to SW4 may be implemented by a metal oxide semiconductor field effect transistor (MOSFET) (or a bipolar junction transistor (BJT), a relay switch, or the like). In this case, each of the plurality of current feedback diodes D11 to D14 is implemented by a body diode connected between a drain and a source of the corresponding MOSFET in a reverse direction. Here, the body diodes may not be separated from each other due to essential characteristics of the MOSFET. Here, D13 and D14 may be omitted as shown in a dotted line.

Figure 3A:
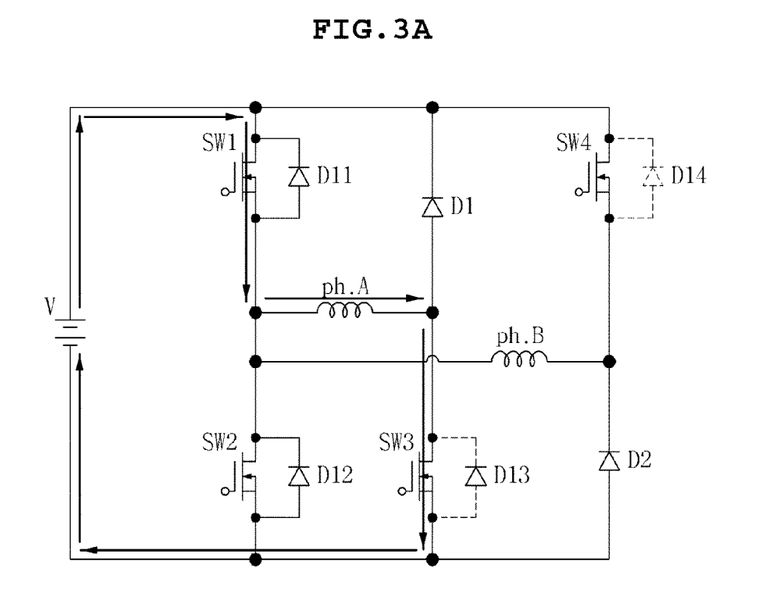
FIGS. 3A to 3C are diagrams showing operation modes 1 to 3 of the active converter for an A phase winding.

In this configuration of the active converter 40, as shown in FIG. 3A, when one SW1 of the pair of common switches SW1 and SW2 and the first phase switch SW3 are switched on, the common switch SW1 and the first phase switch SW3 are operated in the operation mode 1 to excite the A phase winding.

Figure 3B:
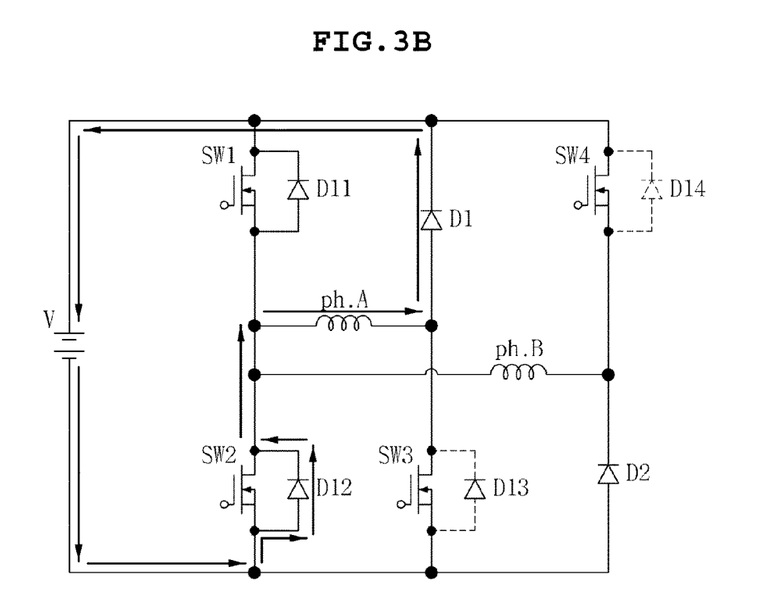

In addition, as shown in FIG. 3B, one D12 of the current feedback diodes D11 and D12 formed in the pair of common switches SW1 and SW2 and the first current feedback diode D1 connected in series with the first phase switch SW3 are used to return residual current to the power supply.

Figure 3C:
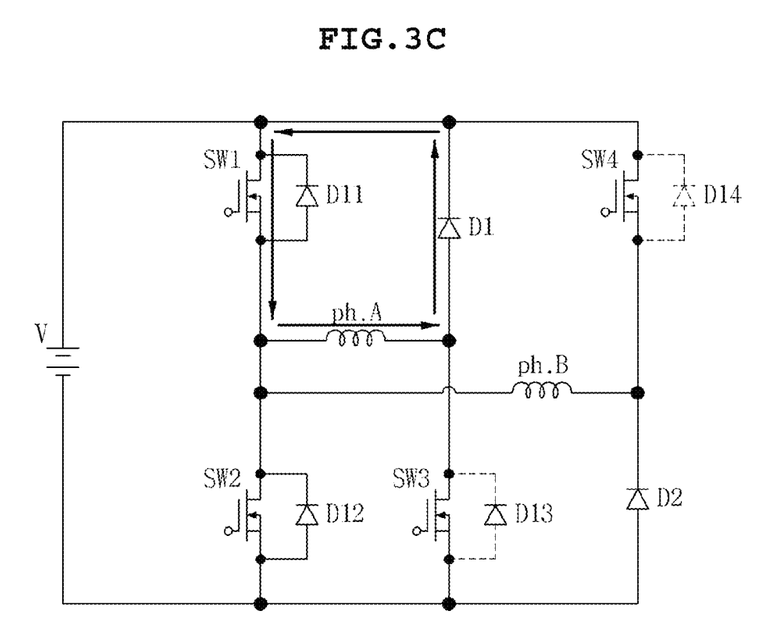

Further, as shown in FIG. 3C, when one SW1 of the common switches SW1 and SW2 of the active converter 40 is switched on, the common switch SW1 is operated in the operation mode 3 together with the first feedback diode D1 to circulate the residual current of the A phase winding.

Figure 4A:
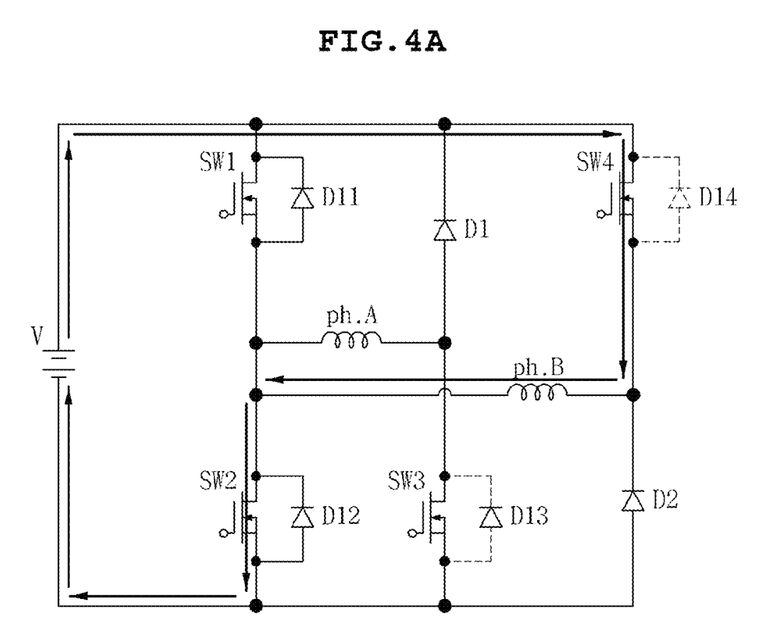
FIGS. 4A to 4C are diagrams showing operation modes 1 to 3 of the active converter for to a B phase winding.

Similarly, even in the case of the B phase, as shown in FIG. 4A, when one SW2 of the pair of common switches SW1 and SW2 and the second phase switch SW4 are switched on, the common switch SW2 and the second phase switch 4 are operated in the operation mode 1 to excite the B phase winding.

Figure 4B:
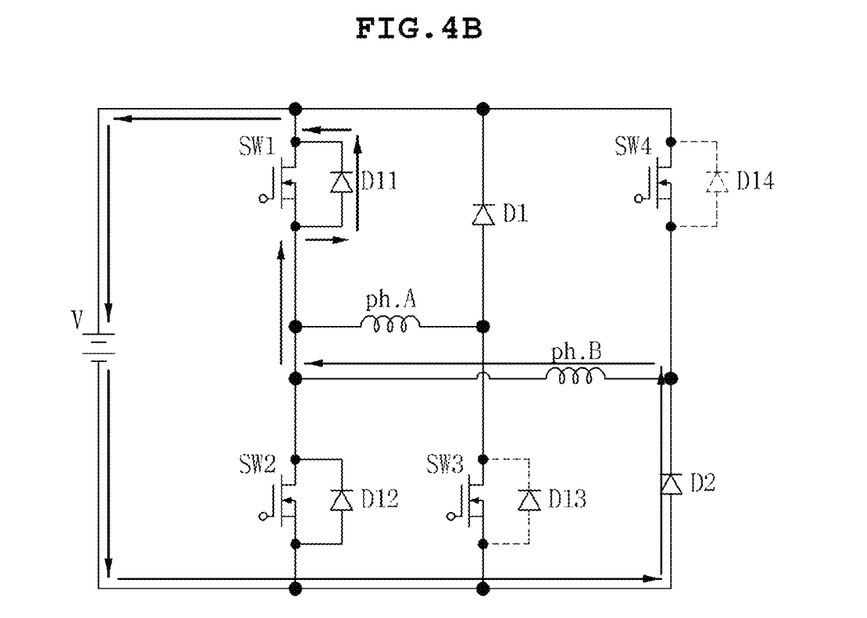

In addition, as shown in FIG. 4B, one D12 of the current feedback diodes D11 and D12 formed in the pair of common switches SW1 and SW2 and the second current feedback diode D2 are used to return residual current to the power supply.

Figure 4C:
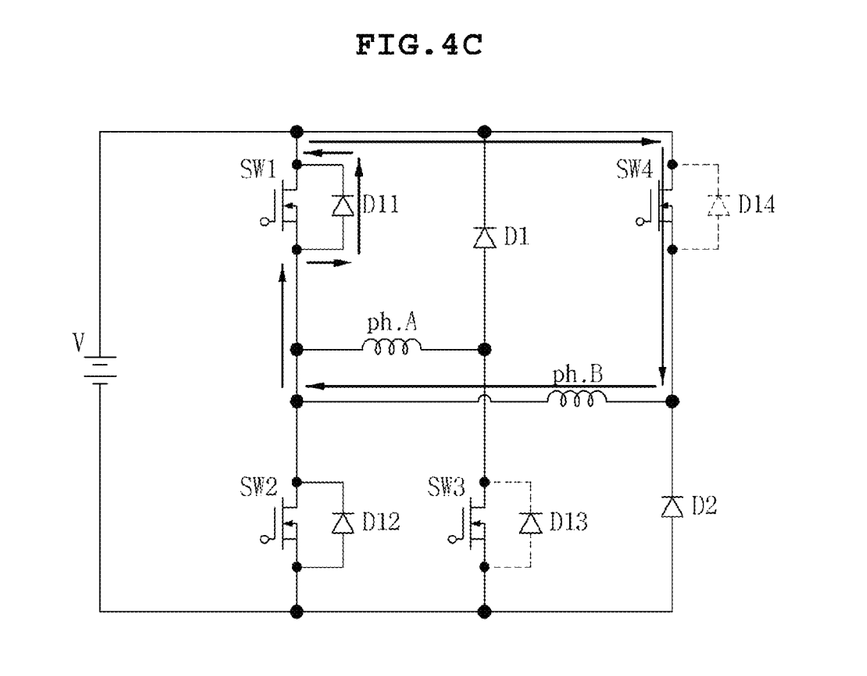

Further, as shown in FIG. 4C, when the second phase switch SW4 of the active converter 40 is switched on, the second phase switch SW4 is operated in the operation mode 3 together with one D11 of the current feedback diodes D11 and D12 formed in the pair of common switches SW1 and SW2 to circulate the residual current of the B phase winding.

As described above, the pair of common switches SW1 and SW2 and the first phase switch SW3 cooperate with each other to form the operation modes 1 to 3 and the pair of common switches SW1 and SW2 and the second phase switch SW4 cooperate with each other to form the operation modes 1 to 3, thereby making it possible to perform various controls.

For example, the switching control apparatus of a switched reluctance motor may implement the first switching scheme using the operation modes 1 and 3.

Figure 5:
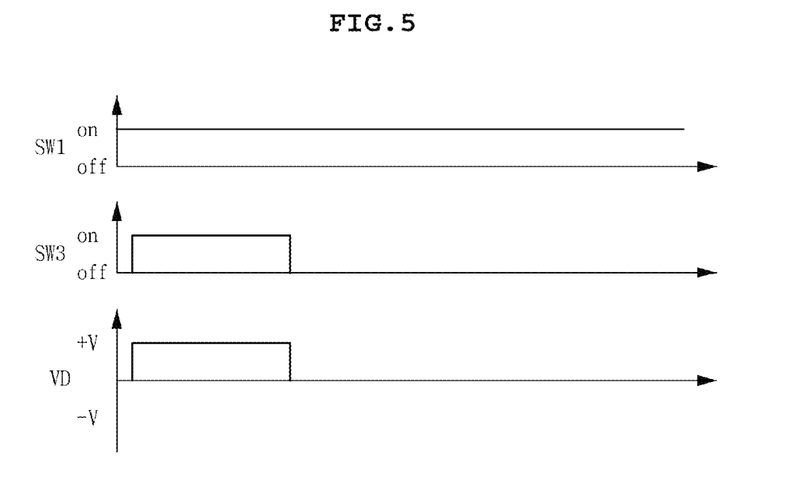
FIG. 5 is a waveform diagram describing a first switching scheme of the active converter of FIG. 1.

More specifically, as shown in FIG. 5, an upper common switch SW1 of the common switches SW1 and SW2 and the first phase switch SW3 are switched on to be operated in the operation mode 1, thereby applying the reference voltage to the A phase winding to excite the A phase winding.

Then, when a predetermined time elapses, as shown in FIG. 5, the upper common switch SW1 of the common switches SW1 and SW2 is maintained in a switch-on state and the first phase switch SW3 is switched off to change the operation mode from the operation mode 1 to the operation mode 3, thereby circulating the residual current of the A phase winding through the first current feedback diode D1. In this case, current induced to the A phase winding is converged to 0 with the passage of time.

This operation is similarly applied to the B phase. First, a lower common switch SW2 of the common switches SW1 and SW2 and the second phase switch SW4 are switched on to be operated in the operation mode 1, thereby applying the reference voltage to the B phase winding to excite the B phase winding.

Then, when a predetermined time elapses, the second phase switch SW4 is maintained in a switch-on state and the lower common switch SW2 of the common switches SW1 and SW2 is changed to a switch-off state to change the operation mode from the operation mode 1 to the operation mode 3, thereby circulating the residual current of the B phase winding through the current feedback diode D11 connected to the upper common switch SW1. In this case, current induced to the B phase winding is converged to 0 with the passage of time.

According to the first switching scheme as described above, the reference voltage and 0 voltage are applied to the phase winding, such that the current following is well made in a current increasing section and a flat section.

The switching control apparatus may implement the second switching scheme using the operation modes 1 to 3 as another control scheme.

Figure 6:
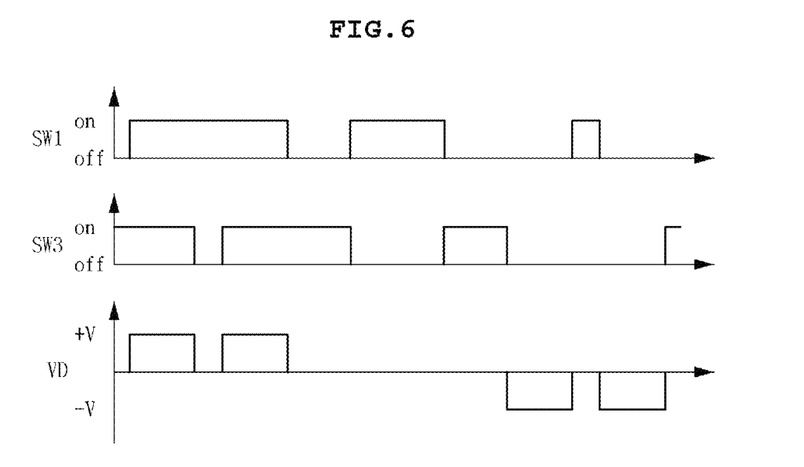
FIG. 6 is a waveform diagram describing a second switching scheme of the active converter of FIG. 1.

More specifically, as shown in FIG. 6, the upper common switch SW1 of the common switches SW1 and SW2 is maintained in a switch-on state for a predetermined time and the first phase switch SW3 is changed from a switch-on state to a switch-off state and again from the switch-off state to the switch-on state for the predetermined time to change the operation mode from the operation mode 1 to the operation mode 3 and again from the operation mode 3 to the operation mode 1, thereby applying the reference voltage to the A phase winding to excite the A phase winding.

Then, the upper common switch SW1 is changed to a switch-off state, from the switch-off state to the switch-on state, and again from switch-on state to the switch-off state. At this time, the first phase switch SW3 is reversely operated to be in the operation mode 3 state, thereby circulating the residual current of the A phase winding.

In addition, the first phase switch SW3 is maintained in the switch-off state and the upper common switch SW1 is changed from the switch-off state to the switch-on state and again from the switch-on state to the switch-off state to be operated in the operation mode 2, in the operation mode 3, and again in the operation mode 2, thereby returning the residual current of the A phase winding to the power supply.

This operation is similarly applied to the B phase. First, the lower common switch SW2 of the common switches SW1 and SW2 is maintained in a switch-on state for a predetermined time and the second phase switch SW4 is changed from a switch-on state to a switch-off state and again from the switch-off to the switch-on state for the predetermined time to change the operation mode from the operation mode 1 to the operation mode 3 and again from the operation mode 3 to the operation mode 1, thereby applying the reference voltage to the B phase winding to excite the B phase winding.

Then, the low common switch SW2 is changed to a switch-off state, from the switch-off state to the switch-on state, and again from the switch-on state to the switch-off state. At this time, the second phase switch SW4 is reversely operated to be in the operation mode 3 state, thereby circulating the residual current of the B phase winding.

In addition, the second phase switch SW4 is maintained in the switch-on state and the upper common switch SW1 is changed from the switch-off state to the switch-on state and again from the switch-on state to the switch-off state to be operated in the operation mode 2, in the operation mode 3, and again in the operation mode 2, thereby returning the residual current of the B phase winding to the power supply.

According to the second switching scheme as described above, the current following is well made in a current increasing section and a current decreasing section.

The switching control apparatus may implement the second switching scheme using the operation modes 1 to 3 as another control scheme.

Figure 7:
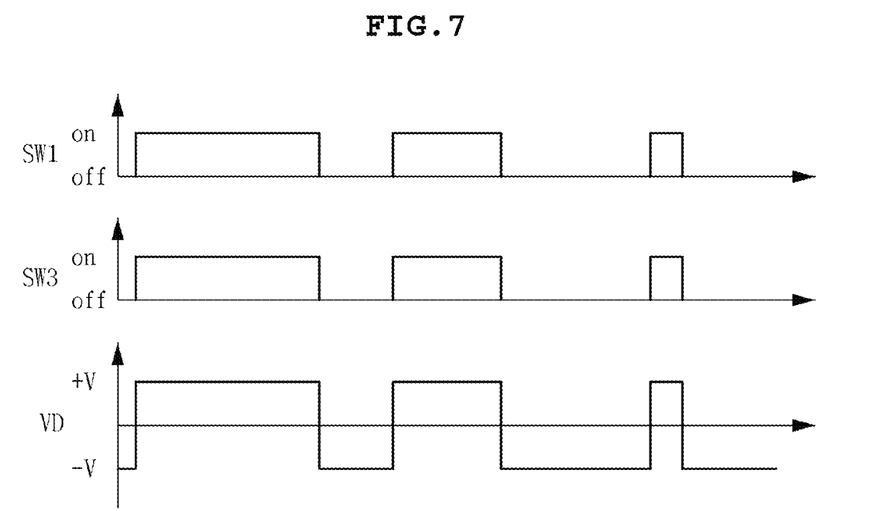
FIG. 7 is a waveform diagram describing a third switching scheme of the active converter of FIG. 1.

More specifically, as shown in FIG. 7, the upper common switch SW1 of the common switches SW1 and SW2 is switched-on and the first phase switch SW3 is switched-on to be operated in the operation mode 1, thereby applying the reference voltage to the A phase winding to excite the A phase winding.

Then, when a predetermined time elapses, the upper common switch SW1 and the first phase switch SW3 are switched off to change the operation mode to the operation mode 3, thereby circulating the residual current of the A phase winding.

In addition, when a predetermined time elapses, the upper common switch SW1 of the common switches SW1 and SW2 and the first phase switch SW3 are switched-on to be operated in the operation mode 1, thereby applying the reference voltage to the A phase winding to excite the A phase winding. In this case, the switch-on time is shorter than the previous switch-on time.

Then, when a predetermined time elapses, the upper common switch SW1 and the first phase switch SW3 are switched off to change the operation mode to the operation mode 3, thereby circulating the residual current of the A phase winding. In this case, the switch-off time is longer than the previous switch-off time.

In addition, when a predetermined time elapses, the upper common switch SW1 of the common switches SW1 and SW2 and the first phase switch SW3 are switched-on to be operated in the operation mode 1, thereby applying the reference voltage to the A phase winding to excite the A phase winding. In this case, the switch-on time is shorter than the previous switch-on time.

Then, when a predetermined time elapses, the upper common switch SW1 and the first phase switch SW3 are switched off to change the operation mode to the operation mode 3, thereby circulating the residual current of the A phase winding. In this case, the switch-off time becomes residual time.

This operation is similarly applied to the B phase. The lower common switch SW2 of the common switches SW1 and SW2 and the second phase switch SW4 are switched on to be operated in the operation mode 1, thereby applying the reference voltage to the B phase winding to excite the B phase winding.

Then, when a predetermined time elapses, the lower common switch SW2 is switched off and the second phase switch SW4 is switched on to change the operation mode to the operation mode 3, thereby circulating the residual current of the B phase winding.

In addition, when a predetermined time elapses, the lower common switch SW2 of the common switches SW1 and SW2 and the second phase switch SW4 is switched on to be operated the operation mode 1, thereby applying the reference voltage to the B phase winding to excite the B phase winding. In this case, the switch-on time is shorter than the previous switch-on time.

Then, when a predetermined time elapses, the upper common switch SW1 is switched off and the second phase switch SW4 is switched on to change the operation mode to the operation mode 3, thereby circulating the residual current of the B phase winding. In this case, the switch-off time is longer than the previous switch-off time.

In addition, when a predetermined time elapses, the lower common switch SW2 of the common switches SW1 and SW2 and the second phase switch SW4 is switched on to be operated the operation mode 1, thereby applying the reference voltage to the B phase winding to excite the B phase winding. In this case, the switch-on time is shorter than the previous switch-on time.

Then, when a predetermined time elapses, the lower common switch SW2 is switched off and the second phase switch SW4 is switched on to change the operation mode to the operation mode 3, thereby circulating the residual current of the B phase winding. In this case, the switch-off time becomes residual time.

According to the third switching scheme, current characteristics having excellent performance during the flat period may be obtained.

Meanwhile, according to the preferred embodiment of the present invention as described above, it is possible to reduce the number of lead wires of the two-phase switched reluctance motor from 3 to 2. Therefore, it is possible to simplify a wiring and have advantages in a circuit design.

In addition, according to the preferred embodiment of the present invention, it is possible to make the diversity of a control excellent by connecting four switches to each phase.

Further, according to the preferred embodiment of the present invention, it is possible to overlap currents with each other by performing independent controls for each phase.

Moreover, according to the preferred embodiment of the present invention, it is possible to reduce a cost and obtain a spatial advantage by reducing the number of independent diodes separated from a switch device.

Furthermore, according to the preferred embodiment of the present invention, it is possible to commonly use the three-phase inverter according to the prior art with the switching apparatus according to the present invention.

Figure 8:
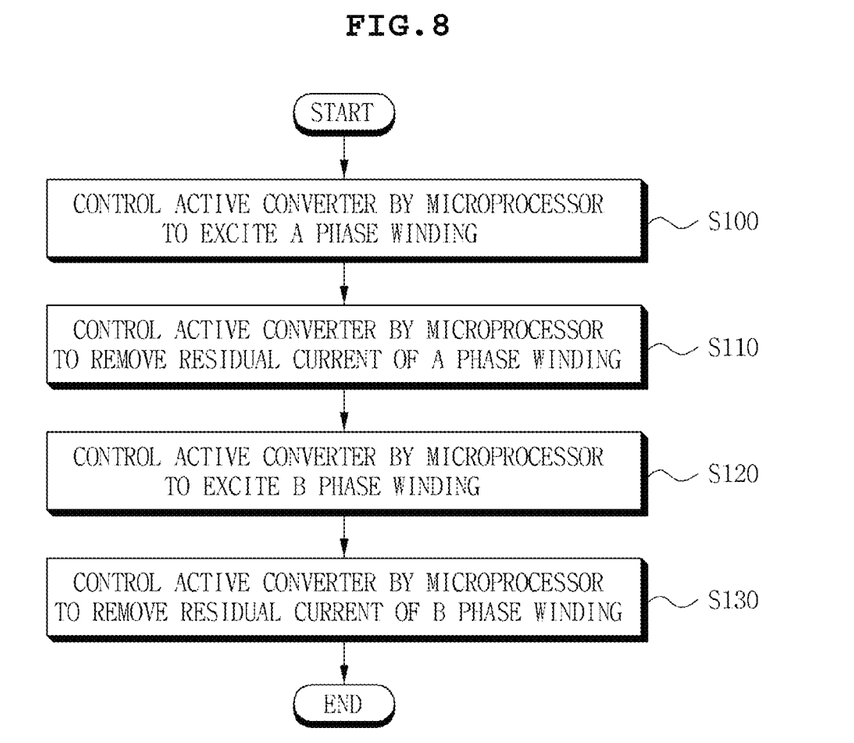
FIG. 8 is a flow chart of a switching control method of a two-phase switched reluctance motor according to the first preferred embodiment of the present invention.

FIG. 8 is a flow chart of a switching control apparatus of a switched reluctance motor according to the first preferred embodiment of the present invention.

Referring to FIG. 8, the microprocessor controls the active converter to excite the A phase winding of the two-phase SRM (S100).

Then, the microprocessor controls the active converter to remove the residual current of the A phase winding of the two-phase SRM (S110).

As the switching scheme in which the microprocessor controls the active converter so as to perform the above-mentioned operation, there are the first switching scheme, the switching scheme, the third switching scheme, and the like, as described above.

Here, according to the first switching scheme, the reference voltage and 0 voltage are applied to the phase winding, such that the current following is well made in the current increasing section and the flat section.

Further, according to the second switching scheme, the current following is well made in the current increasing period and the current decreasing section.

Next, according to the third switching scheme, the current characteristics having excellent performance during the flat period may be obtained.

The user selects a scheme appropriate for an application among the above-mentioned schemes in consideration of advantages and uses the microprocessor to operate the active converter in a corresponding scheme.

Thereafter, the microprocessor controls the active converter to excite the B phase winding of the two-phase SRM (S120).

Next, the microprocessor controls the active converter to remove the residual current of the B phase winding of the two-phase SRM (S130).

As the switching scheme in which the microprocessor controls the active converter so as to perform the above-mentioned operation, there are the first switching scheme, the switching scheme, the third switching scheme, and the like, as described with reference to the A phase winding.

As set forth above, according to the preferred embodiment of the present invention, even in the state in which the number of lead wires of the two-phase switched reluctance motor is reduced from 3 to 2, four switches are connected to each phase, thereby making the diversity of control excellent.

In addition, according to the preferred embodiment of the present invention, it is possible to overlap currents with each other by performing independent controls for each phase.

Further, according to the preferred embodiment of the present invention, it is possible to reduce a cost and obtain a spatial advantage by reducing the number of independent diodes separated from a switch device.

Furthermore, according to the preferred embodiment of the present invention, in the case in which each of the plurality of switches is implemented by the MOSFET, each of the plurality of current feedback diodes may be implemented by a body diode connected between a drain and a source of the corresponding MOSFET in a reverse direction, such that a separately separated diode is not required.

As a result, it is possible to reduce a cost and have an advantage such as space utilization in design.

Furthermore, according to the preferred embodiment of the present invention, it is possible to commonly use the three-phase inverter according to the prior art with the switching apparatus according to the present invention.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A switching control apparatus of a two-phase switched reluctance motor, comprising:
a rectifying unit rectifying commercial power; and
an active converter including a pair of common switches having two phase windings of the two-phase SRM commonly connected to a contact therebetween, a first phase switch and a first current feedback diode bridge-connected to the pair of common switches at any one of the two phase windings and connected in series with each other, a second phase switch and a second current feedback diode bridged-connected to the pair of common switches at the other of the two phase windings and connected in series with each other, and a plurality of current feedback diodes each connected to the switches and operated in a plurality of operation modes to supply the power provided from the rectifying unit to the two-phase SRM, thereby driving the two-phase SMR;
wherein:
the active converter is configured to be changed from a first operation mode, in which a voltage is applied to at least one of said windings to excite one of said windings, to a second operation mode, in which residual current is circulated in said one of said windings, according to a predetermined scheme; and said predetermined scheme comprises one of:

controlling the active converter in the first operation mode to excite said one of said windings, switching from said first mode to said second mode and controlling the active converter in the second operation mode until current induced to said one of said windings is converged to zero; and controlling the active converter in the first operation mode for a first time period, then switching from the first operation mode to the second operation mode for a second time period, then switching from the second operation mode to the first operation mode for a third time period, said third time period being shorter than said first time period, the switching from said first operation mode to the second operation mode for a fourth time period, said fourth time period being longer than said second time period.

2. The switching control apparatus as set forth in claim 1, further comprising a microprocessor sensing a position and a speed of the two-phase SRM to control the active converter.

3. The switching control apparatus as set forth in claim 2, wherein the microprocessor controls the active converter so as to be changed from the first operation mode to the second operation mode.

4. The switching control apparatus as set forth in claim 2, wherein the microprocessor can control the active converter so as to be changed from the first operation mode to the third operation mode and from the third operation mode to the second operation mode.

5. The switching control apparatus as set forth in claim 2, wherein the microprocessor controls the active converter so as to repeat a process of changing an operation mode of the active converter from the first operation mode to the second operation mode.

6. The switching control apparatus as set forth in claim 1, wherein the pair of common switches includes an upper common switch and a lower common switch connected in series with each other and has the two phase winding of the two-phase SRM connected to the contact therebetween, the first phase switch and the first current feedback diode are connected in series with each other, have any one of the two phase windings of the two-phase SRM connected to a contact therebetween, and are bridge-connected to the pair of common switches, and the second phase switch and the second current feedback diode are connected in series with each other, have the other of the two phase windings of the two-phase SRM connected to a contact therebetween, and are bridge-connected to the pair of common switches.

7. The switching control apparatus as set forth in claim 6, wherein the upper common switch and the first phase switch are switched on to be operated in the first operation mode with respect to any one of the two phase windings of the two-phase SRM, and the lower common switch and the second phase switch are switched on to be operated in the first operation mode with respect to the other of the two phase windings of the two-phase SRM.

8. The switching control apparatus as set forth in claim 6, wherein the active converter can be operated in a third operation mode in which the current feedback diode connected to the lower common switch and the first current feedback diode are operated with respect to any one of the two phase windings of the two-phase SRM to return residual current to the rectifying unit, and the current feedback diode connected to the upper common switch and the second phase switch are switched on to be operated in the third operation mode with respect to any one of the two phase windings of the two-phase SRM.

9. The switching control apparatus as set forth in claim 6, wherein the current feedback diode connected to the first phase switch provides a circulation path of residual current in a state in which the upper common switch is switched on to be operated in the second operation mode with respect to any one of the two phase windings of the two-phase SRM, and the current feedback diode connected to the upper common switch provides a circulation path of the residual current in a state in which the second phase switch is switched on to be operated in the second operation mode with respect to any one of the two phase windings of the two-phase SRM.

10. A switching control method of a two-phase switched reluctance motor, comprising:

(A) controlling, in a microprocessor, an active converter including a pair of common switches having two phase windings of the two-phase SRM commonly connected to a contact therebetween, two groups of phase switches and current feedback diodes each bridge-connected to the pair of common switches at corresponding phase windings and connected in series with each other, and a plurality of current feedback diodes to excite any one of the phase windings and then circulate residual current; and (B) controlling, in the microprocessor, the active converter to excite the other of the phase windings and then circulate residual current;

wherein:

in the control of the active converter in steps (A) and (B), the microprocessor controls the active converter so as to be changed from a first operation mode, in which a voltage is applied to one of said windings to excite said one of said windings, to a second operation mode, in which residual current is circulated in said one of said windings, according to a predetermined scheme; and said predetermined scheme comprises one of:

controlling the active converter in the first operation mode to excite said one of said windings, switching from said first mode to said second mode and controlling the active converter in the second operation mode until current induced to said one of said windings is converged to zero; and controlling the active converter in the first operation mode for a first time period to excite said one of said windings, then switching from the first operation mode to the second operation mode for a second time period, then switching from the second operation mode to the first operation mode for a third time period, said third time period being shorter than said first time period, the switching from said first operation mode to the second operation mode for a fourth time period, said fourth time period being longer than said second time period.

11. The switching control method as set forth in claim 10, wherein the pair of common switches includes an upper common switch and a lower common switch connected in series with each other and has the two phase winding of the two-phase SRM connected to the contact therebetween, the two groups of phase switches and current feedback diodes includes a first phase switch and a first current feedback diode and a second phase switch and a second current feedback diode, the first phase switch and the first current feedback diode are connected in series with each other, have any one of the two phase windings of the two-phase SRM connected to a contact therebetween, and are bridge-connected to the pair of common switches, and the second phase switch and the second current feedback diode are connected in series with each other and have the other of the two phase windings of the two-phase SRM connected to a contact therebetween, and are bridge-connected to the pair of common switches.

12. The switching control method as set forth in claim 11, wherein the microprocessor controls the active converter so as to repeat a process of changing an operation mode of the active converter between the first operation mode and the second operation mode.

\* \* \* \* \*